US008985676B2

(12) United States Patent
Orellano et al.

(10) Patent No.: US 8,985,676 B2
(45) Date of Patent: Mar. 24, 2015

(54) VEHICLE COMPONENT COMPRISING A FLOW GUIDING ELEMENT

(75) Inventors: Alexander Orellano, Berlin (DE); Martin Schober, Berlin (DE); Andreas Tietze, Berlin (DE); Rene Blaschko, Berlin (DE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 13/821,814

(22) PCT Filed: Sep. 7, 2011

(86) PCT No.: PCT/EP2011/065498
§ 371 (c)(1),
(2), (4) Date: May 21, 2013

(87) PCT Pub. No.: WO2012/032095
PCT Pub. Date: Mar. 15, 2012

(65) Prior Publication Data
US 2013/0291759 A1    Nov. 7, 2013

(30) Foreign Application Priority Data

Sep. 10, 2010 (DE) .......................... 10 2010 044 933
Sep. 19, 2010 (DE) .......................... 10 2010 045 631
Sep. 21, 2010 (EP) ...................................... 10178087

(51) Int. Cl.
*B62D 35/00* (2006.01)
*B61D 17/02* (2006.01)
*B60L 5/20* (2006.01)

(52) U.S. Cl.
CPC . *B61D 17/02* (2013.01); *B60L 5/20* (2013.01); *Y02T 30/32* (2013.01)

USPC .......................... 296/180.1; 244/130; 244/200

(58) Field of Classification Search
USPC ............... 296/180.1; 180/65.1; 244/130, 200; 701/22
See application file for complete search history.

(56) References Cited

U.S. PATENT DOCUMENTS

| 5,497,866 A | 3/1996 | Kobayashi et al. |
| 6,276,636 B1 | 8/2001 | Krastel |
| 2005/0040669 A1 | 2/2005 | Wood |
| 2011/0106349 A1* | 5/2011 | Sakita .............................. 701/22 |

FOREIGN PATENT DOCUMENTS

| DE | 2830027 A1 | 1/1979 |
| EP | 0649767 A2 | 10/1994 |
| EP | 2106983 A2 | 10/2009 |
| JP | 8182107 A | 7/1996 |
| JP | 9205702 A | 8/1997 |

* cited by examiner

*Primary Examiner* — Lori L Lyjak
(74) *Attorney, Agent, or Firm* — The Webb Law Firm

(57) ABSTRACT

A vehicle component includes a surface which, during operation, is exposed to an air flow. The surface includes a separating area where the air flow separates from the surface, and at least one obstructing element associated with the separating area for introducing an obstruction into the air flow. The obstructing element includes at least one guide surface which protrudes into the air flow. The guide surface is inclined relative to the local direction of the main air flow so that it confers on the part of the main air flow that impacts the guide surface a speed component that runs perpendicular to the local direction of the main air flow and induces turbulence in the air flow downstream of the obstructing element.

15 Claims, 3 Drawing Sheets

VEHICLE COMPONENT COMPRISING A FLOW GUIDING ELEMENT

BACKGROUND OF THE INVENTION

1. Field of the Invention

The present invention relates to a vehicle component for a vehicle, in particular a rail vehicle for high-speed traffic, comprising a surface which, during operation, is exposed to a relative wind-induced air flow having a local main flow direction, wherein the surface has a separation region in which the air flow separates from the surface, and at least one perturbing element associated to the separation region is provided, which is formed in order to introduce a perturbation into the air flow. The invention furthermore relates to a vehicle comprising such a vehicle component.

2. Description of Related Art.

With modern rail vehicles having comparatively high rated operating speeds, the problem generally arises that considerable noise emissions take place, specifically at high speeds, at particular positions on the vehicle where the flow separates from the vehicle components arranged there. This is due, inter alia, to the fact that a continuously widening shear layer is created downstream of the separation point. Periodic formation of pronounced vortices (so-called Kelvin-Helmholtz instability), and the associated sound emission, generally take place in this shear layer.

Such flow separation, with the described effects, occurs on a plurality of different components of the vehicle. For example, the described sound emission naturally takes place particularly at components protruding from the vehicle, for example a pantograph or the like. Likewise, however, regions of the wagon body, the running gear or other attached components (such as roof containers etc.) are also subject to this effect.

In connection with the flow separating at the leading end of a running gear cutout, the document EP 2 106 983 A2 proposes the provision of turbulators in the region of the flow separation edge, these being distributed in the transverse direction of the vehicle and intended to introduce a plurality of smaller turbulences into the shear layer, in order to suppress at least substantially the periodic formation of the above-described vortices. The turbulators may in this case be formed both by a highly roughened surface and by comparatively highly pronounced crenelated projections in the outer skin of the wagon body, which are oriented in the longitudinal direction of the vehicle and therefore in the direction of the local main flow direction. The crenelated projections may themselves in turn be formed by prismatic elements fitted onto the outer skin or corresponding notches in the outer skin of the wagon body.

Although the primarily described configuration with the notches in the outer skin of the wagon body makes it possible to reduce the formation of periodic vortices and the associated noise emission, by a certain increase in the turbulence in the shear layer, it nevertheless entails the disadvantage that the shear layer widens comparatively rapidly, or strongly, in the height direction of the vehicle, so that on the one hand there is a comparatively large impact area of the shear layer on following vehicle components (such as the running gear or into the following bounding wall of the running gear cutout) with the associated sound emission, which is to this extent increased. On the other hand, naturally, such a strongly widened shear layer considerably increases the flow resistance of the relevant vehicle components, and therefore of the overall vehicle.

SUMMARY OF THE INVENTION

It is therefore an object of the present invention to provide a vehicle component of the type mentioned in the introduction which does not entail the disadvantages mentioned above, or at least entails them to a lesser extent, and which in particular allows a reduction in the sound emission of the vehicle in a simple way without a significant increase in the flow resistance.

The present invention is based on the technical teaching that a reduction in the sound emission of the vehicle in the region of particular vehicle components, which are exposed to an air flow, is achieved in a simple way, without significantly increasing the flow resistance, when the perturbing element has a guide face which is inclined with respect to the local main flow direction and which deflects the impacting part of the air flow transversely with respect to the local main flow direction, in such a way that turbulence is induced in the air flow downstream of the perturbing element. This guide face inclined with respect to the local main flow direction has the advantage over the known configurations, with their guide faces oriented parallel to the local main flow direction, that the desired turbulence in the shear layer is achieved reliably and directly by the transverse deflection of a part of the flow transversely with respect to the local main flow direction. This applies, in particular, over a wide vehicle speed range down to as far as comparatively low vehicle speeds.

Furthermore, it is thereby possible to configure the introduction of the turbulence so that it is spatially concentrated over a large region, for example by the following ends of a plurality of guide faces being arranged in a correspondingly spatially concentrated way (for example on a common line). This is advantageous in so far as the widening of the shear layer, and the associated flow resistance, can thereby be kept low.

Lastly, the widening of the shear layer, and the associated flow resistance, can also be kept low by suitable selection of the orientation of the inclination with respect to the local main flow direction. For instance, the transverse deflection of the respective part of the flow may take place in the plane of main extension of the shear layer, so that the flow energy introduced into the shear layer perpendicularly to the plane of main extension of the shear layer, and consequently the widening of the shear layer, can be kept minimised.

According to one aspect, the present invention therefore relates to a vehicle component for a vehicle, in particular a rail vehicle for high-speed traffic, comprising a surface which, during operation, is exposed to a relative wind-induced air flow having a local main flow direction, wherein the surface has a separation region in which the air flow separates from the surface, and at least one perturbing element associated to the separation region is provided, which is formed in order to introduce a perturbation into the air flow. The perturbing element has at least one guide face protruding into the air flow, the guide face being formed, and inclined by an inclination angle with respect to the local main flow direction, in such a way that a velocity component, which is oriented transversely with respect to the local main flow direction and which induces turbulence downstream of the perturbing element, is imposed to the part of the air flow striking the guide face.

The inclination of the guide face with respect to the local main flow direction may in principle be oriented in any desired way. For example, the guide face may be oriented in such a way that the guide face is inclined in the manner of a ramp starting from the surface, both with respect to the local surface normal of the surface and with respect to the local main flow direction, although the widening of the shear layer is promoted by this. Preferably, local surface normal defines a local normal plane with the local main flow direction, the guide face then being inclined by the inclination angle with respect to the local normal plane. By means of this, the described transverse deflection in the plane of main extension of the shear layer can be achieved, with the associated advantages relating to the small widening of the shear layer and the low flow resistance.

The inclination angle of the guide face may in principle be selected to be of any desired size, so long as local turbulence is reliably generated in the shear layer. According to advantageous variants of the vehicle component according to the invention, the inclination angle is 20° to 70°, preferably 30° to 60°, more preferably 40° to 50°, and in particular substantially 45°.

Similar considerations apply for the dimensions of the guide face. These may also in principle be selected to be of any desired size, so long as local turbulence is reliably generated in the shear layer. Preferably, the guide face has a length dimension which is 5 mm to 80 mm, preferably 15 mm to 65 mm, more preferably 30 mm to 50 mm, in particular substantially 40 mm. In addition or as an alternative, the guide face preferably has a height dimension which is 2 mm to 10 mm, preferably 3 mm to 8 mm, more preferably 4 mm to 6 mm, in particular substantially 5 mm.

The guide face may in principle be configured in any desired way. For instance, it may be curved at least in sections and/or planar at least in sections, so long as the desired transverse deflection of the impacting part of the air flow is achieved at the following end of the guide face. Preferably, the guide face is substantially planar, since it can be produced particularly simply in this case.

The guide face may in principle be achieved by any desired configuration of the vehicle component. In preferred variants of the invention, the guide face is formed on a fin-like projection of the surface, the fin-like projection being formed in particular substantially prismatically, since it can then be produced particularly simply.

Preferably, the fin-like projection has a thickness dimension which is 2 mm to 10 mm, preferably 3 mm to 8 mm, more preferably 4 mm to 6 mm, in particular substantially 5 mm, since particularly favourable introduction of the local turbulences into the shear layer can thereby be achieved, without inducing strong widening of the shear layer.

In other variants of the vehicle component according to the invention, the guide face is formed as a side wall of an indentation of the surface, since the desired local transverse deflection can also be achieved to the desired extent with such a configuration.

Depending on the size of the separation region, just a single perturbing element having a single guide face, or optionally a plurality of guide faces, may be sufficient in order to introduce the desired perturbation into the shear layer. In the case of larger separation regions, however, a plurality of perturbing elements are preferably provided.

The perturbing elements may in principle be arranged and formed in any desired way. In particular, it is also possible to configure at least some of the perturbing elements with a different orientation, different spacing and different configuration from other perturbing elements. It is thereby possible to carry out adaptation to the specific situation of the vehicle component in respect of its geometry and/or flow conditions.

Preferably, the guide faces of two neighbouring perturbing elements are spaced apart transversely with respect to the local main flow direction by a transverse distance which is 20 mm to 100 mm, preferably 30 mm to 80 mm, more preferably 40 mm to 60 mm, in particular substantially 50 mm.

The guide faces of the perturbing elements may in principle be oriented with respect to one another in any desired way. For instance, the guide faces of two neighbouring perturbing elements may be inclined in the opposite sense to one another with respect to the local main flow direction. This has the advantage that a configuration can thereby be achieved in which the aerodynamic forces caused by the local deflection of the flow, which act on the vehicle component transversely with respect to the local main flow direction, at least partially cancel one another out. In addition or as an alternative, the guide faces of two neighbouring perturbing elements may be inclined in the same sense with respect to the local main flow direction.

The distribution of the perturbing elements may, as mentioned, be selected in any desired way. Preferably, the surface has a transverse dimension transversely with respect to the local main flow direction, and the perturbing elements are distributed along the transverse dimension of the surface, in particular uniformly at least in sections.

The perturbing elements according to the invention may be placed on any desired vehicle components which are exposed to a relative wind-induced air flow. For instance, according to preferred variants of the invention, the surface is formed in order to constitute at least a part of an outer skin of a wagon body of the vehicle. The perturbing elements may then, for example, be placed in the region of any desired recesses of the outer skin.

Placement of the perturbing elements according to the invention in the region of the lower side of the vehicle, particularly in the region of the running gear, is particularly advantageous. Accordingly, the surface is preferably formed in order to be arranged on a lower side of the wagon body, the surface being, in particular, formed in order to be arranged in the region of an end of a running gear cutout of the wagon body which is the leading end during operation.

Another preferred area for placement of the perturbing elements according to the invention lies in the region of the vehicle components protruding from the vehicle. For example, the vehicle component may be part of a pantograph of the vehicle, the pantograph having a contact device comprising a contact element for making contact with a power line, and the surface being arranged, in particular, on a lower side of the contact device, facing away from the contact face of the contact element. Particularly advantageous reduction of the sound emission by such vehicle components protruding from the vehicle is thereby possible.

The present invention furthermore relates to a vehicle comprising a vehicle component according to the invention. It is in particular a vehicle for high-speed traffic with a nominal operating speed of more than 250 km/h, in particular more than 300 km/h, since the advantages of the invention are manifested particularly well in this case.

BRIEF DESCRIPTION OF THE DRAWINGS

Other preferred configurations of the invention become apparent from the dependent claims and/or the following description of preferred embodiments, which refers to the appended drawings, in which:

DETAILED DESCRIPTION OF THE PREFERRED EMBODIMENTS

First Embodiment

Figure 1:
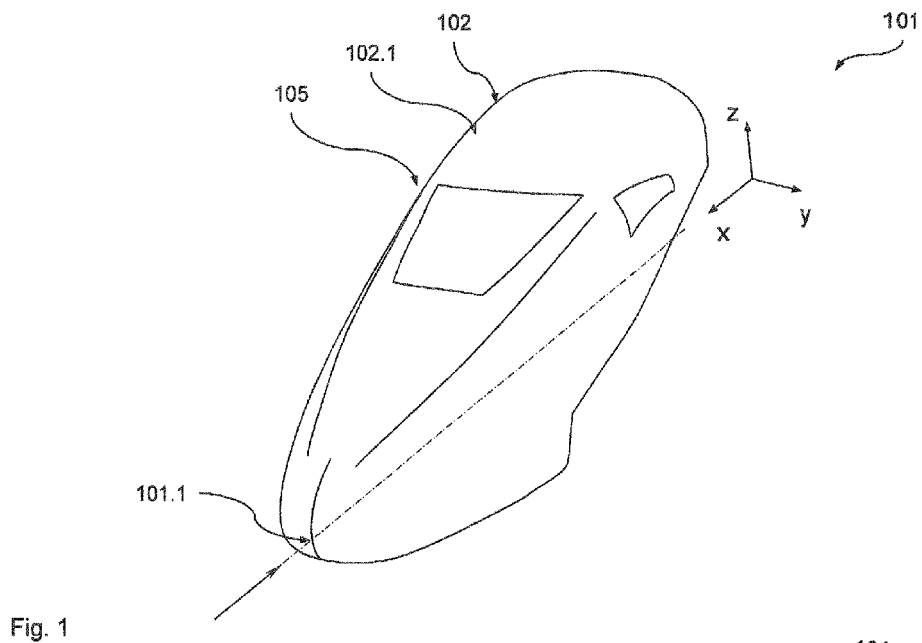
FIG. 1 shows a schematic perspective view of a part of a preferred embodiment of the vehicle according to the invention, comprising a preferred embodiment of the vehicle component according to the invention.
Figure 2:
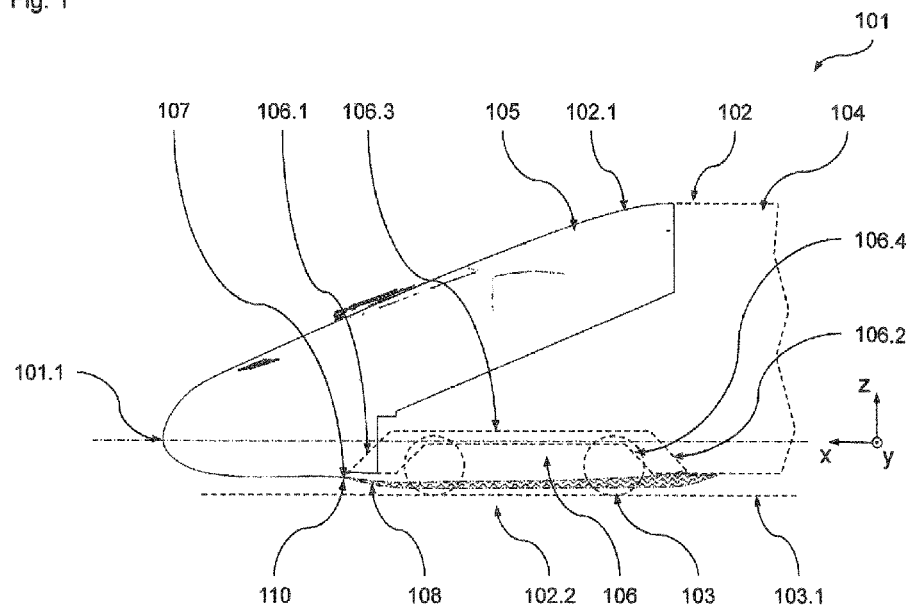
FIG. 2 shows a schematic side view of the vehicle of FIG. 1.

A first preferred embodiment of the vehicle according to the invention in the form of a rail vehicle 101 will be described below with reference to FIGS. 1 to 6. The rail vehicle 101 is an end carriage of a multiple-unit train for high-speed traffic, the nominal operating speed of which is more than 250 km/h, namely $v_n=300$ km/h.

At this point, it should be noted that the following remarks are given for a flow state when driving the vehicle 101 with constant speed on a straight level track without the influences of side wind or the like, unless explicit indications are given otherwise. It is to be understood that, in the event of a departure from this operating state (for example due to negotiation of a curve, or side wind etc.), differences may arise from the flow conditions described, in particular the flow directions, although the basic statements substantially still apply.

The vehicle 101 comprises a wagon body 102, which defines an outer skin 102.1 of the vehicle 101. The wagon body 102 is supported in the conventional way in the region of its two ends, in each case on a running gear in the form of a bogie 103. It is, however, to be understood that the present invention may also be used in conjunction with other configurations, in which the wagon body is supported merely on one running gear.

For easier understanding of the explanations below, a vehicle coordinate system x,y,z is indicated in the figures (defined by the wheel contact plane 103.1 of the bogie 103), in which the x coordinate denotes the longitudinal direction of the rail vehicle 101, the y coordinate denotes the transverse direction of the rail vehicle 101 and the z coordinate denotes the height direction of the rail vehicle 101.

The wagon body 102 has a main section 104 and a head section 105, which is adjacent thereto and represents a preferred embodiment of the vehicle component according to the invention.

The main section 104 has (apart from local sections for functional components of the vehicle, for example pantograph, roof container etc.) a substantially prismatic configuration (with substantially identical cross-sectional contours of the outer skin 102.1 along the longitudinal direction of the vehicle).

Conversely, the head section 105 tapers towards the end of the vehicle 101 both in the height direction of the vehicle and in the transverse direction of the vehicle, so that during operation of the vehicle 101 it can form a free vehicle end of the vehicle 101. Provided in the head section 105, there is a compartment for the vehicle driver, from which the vehicle driver controls the vehicle 101 when, during normal operation of the vehicle 101, the head section 105 forms the leading end 101.1 of the vehicle 101 (i.e. the driving direction points in the direction of the positive x axis, which will be assumed below unless explicit indications are given otherwise).

The bogie 103 is arranged in a running gear cutout 106 of the wagon body 102, which is bounded at its leading end by a leading wall 106.1 and at its following end by a following wall 106.2, these being connected to one another by an upper wall 106.3. On both sides of the wagon body, the running gear cutout 106 is bounded by skirts 106.4.

At the lower end of the leading wall 106.1, in this operating mode, the outer skin 102.1 of the wagon body 102 forms a separation region in the form of a flow separation edge 107, at which the air flow (sweeping over the lower side 102.2 of wagon body 102 from the free end of the vehicle to the vehicle running gear cutout 106) separates from the outer skin 102.1, i.e. the surface of the wagon body 102. The flow separation edge 107 is in this case arranged at a trailing edge distance DA away from the free end 101.1 of the vehicle in the longitudinal direction of the vehicle (see FIG. 2).

Figure 3:
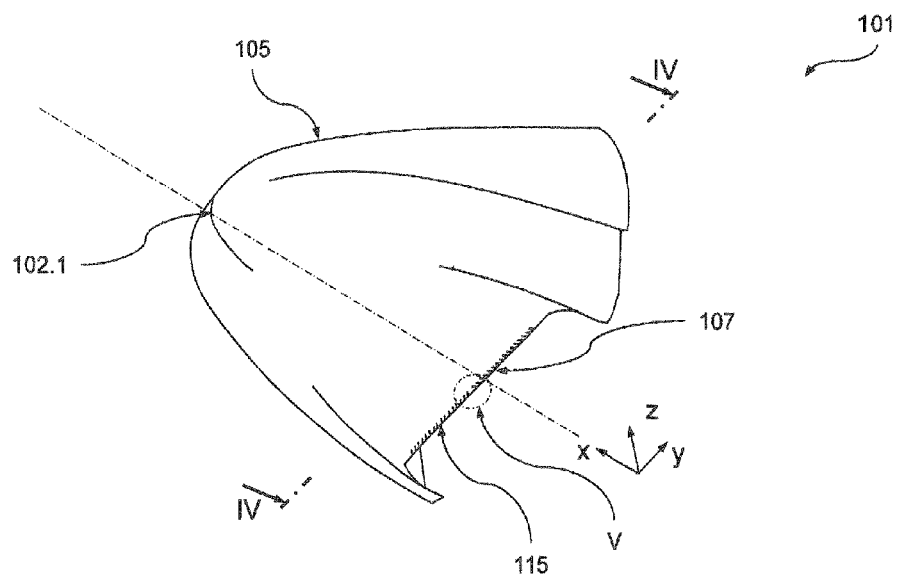
FIG. 3 shows a schematic perspective view of the outer skin of the vehicle of FIG. 1 in the region of the vehicle nose from below.

In the present example, the flow separation edge 107 is formed substantially in a straight line (see in particular FIG. 3). It is, however, to be understood that in other variants of the invention the flow separation edge may have any desired suitable course (for example straight at least in sections and/or curved at least in sections).

After separation of the air flow, as a result of the different flow speeds in the running gear cutout 106 and the gap underneath towards the track bed, a so-called shear layer 108 is formed therein. The flow conditions within the shear layer 108 are very unstable owing to the speed differences, so that, besides widening of the shear layer 108 in the height direction of the vehicle (z direction), periodic formation of vortices takes place in the further course of the flow.

In the case of conventional vehicles, this periodic vortex formation causes substantial sound emission in this region of the vehicle. This is further exacerbated by these vortices striking the following vehicle components, in particular components of the bogie, but above all the following wall of the running gear cutout.

These components are thereby excited to vibrate, and therefore likewise so as to emit sound.

In order to reduce this sound emission, the head module 105 according to the invention has a flow guiding device 109 on its lower side, between the free end 101.1 of the vehicle and the flow separation edge 107 in the longitudinal direction of the vehicle. In the region of the flow separation edge 107, by means of a deflection region 110, the flow guiding device 109 respectively imposes to the air flow a downwardly directed main flow direction 111 which is inclined by an angle $\alpha=6°$ with respect to the longitudinal direction of the vehicle (see in particular FIG. 6), angular deviations of up to $\pm1°$ being possible.

The effect advantageously achieved by this is that the shear layer 108 is also deflected downwards (see FIG. 2) and therefore, at the nominal operating speed of the vehicle 101, it is at most over 10% of its local height extent that it strikes the bogie 103, if at all. In the further course of the flow, this has the effect that the shear layer 108 strikes the following wall 106.2 of the running gear cutout 106 at most over 20% of the local height extent of the said layer. Both effects lead to the aforementioned reduction of the vibration excitation of these vehicle components and the sound emission thereby induced.

It is to be understood that the deflection of the main flow direction 111 downwards may in principle be selected to be as large as possible, in order to achieve the described effect. In particular, the angle α may vary over the width of the vehicle (i.e. in the transverse direction of the vehicle), in order to achieve corresponding adjustment or adaptation in relation to the following vehicle components. It is, however, particularly favourable for the flow not to be deflected too far downwards in the direction of the track bed, in order to avoid undesired effects as much as possible, for example an increase in the flow resistance, the flight of ballast, etc.

In the region of the flow separation edge 107, 17 perturbing elements in the form of turbulator elements 115 are arranged on both sides of the longitudinal mid-plane (xz plane). These turbulator elements 115 are used to introduce turbulences into the shear layer 108 formed after the flow separation at the flow separation edge 107. In this way, the advantage, described in the introduction, of avoiding noise emissions due to the periodic formation of vortices within the shear layer 108 is achieved.

As can be seen in particular from FIGS. 3 to 6, each turbulator element 115 is formed as a short fin-like or rib-like projection on the lower side of the outer skin 102.1. The respective turbulator element 115 has a guide face 115.1 inclined with respect to the longitudinal direction of the vehicle (x direction) and with respect to the transverse direction of the vehicle (y direction). The substantially planar guide face 115.1 protrudes into the air flow, so that a part of the air flow strikes the guide face 115.1 with the local main flow direction 111 parallel to the longitudinal mid-plane of the vehicle (xz plane) and is deflected by said face in the transverse direction of the vehicle.

The guide face 115.1 is inclined by an inclination angle α with respect to a local normal plane which is spanned, or defined, by the local surface normal 112 of the surface (formed by the outer skin 102.1) and the local main flow direction 111. By means of this, a transverse deflection of the part of the flow striking the guide face 115.1 is achieved in the plane of main extension of the shear layer 108 (the plane of main extension of the shear layer 108 being spanned, or defined, by the local main flow directions 111). As already described above, this transverse deflection acting primarily within the plane of main extension is advantageous with respect to small widening of the shear layer 108 in the height direction of the vehicle (z direction) and the low flow resistance.

The inclination angle α with respect to the normal plane, and therefore also with respect to the local main flow direction 111, is selected in such a way that a velocity component, which is oriented transversely with respect to the local main flow direction 111 and which induces turbulence in the shear layer 108 downstream of the turbulator element 115, is imposed to the part of the air flow striking the guide face.

The inclination angle α may in principle be selected to be arbitrarily large, so long as local turbulence is reliably generated in the shear layer 108. In the present example, the inclination angle is substantially α=45°, since sufficiently strong transverse deflection of the local flow, which reliably generates the desired local turbulence in the shear layer 108, is thereby achieved.

In the present example, the guide face 115.1 has a length dimension L which is substantially L=40 mm. Furthermore, the fin- or rib-like projection 115 on which the guide face 115.1 is formed has a thickness dimension which is substantially D=5 mm. The thickness dimension is substantially constant over the length of the projection 115, so that a geometry which is particularly simple to produce is achieved.

Lastly, the guide face 115.1 has an average height dimension Hm which is substantially Hm=6.5 mm, the height dimension H varying between Hn=5 mm (at the following end) and Hv=8 mm (at the leading end). It is, however, to be understood that in other variants of the invention the guide face may also have a constant height dimension H, which corresponds for example to H=5 mm. In the simplest case, the guide face is then formed on a prismatic rib of constant thickness and height.

As mentioned, in the present example the guide face 111 is configured to be substantially planar. It is, however, to be understood that in other variants of the invention it may also be curved at least in sections, so long as the desired transverse deflection of an impacting part of the air flow is achieved at the following end of the guide face.

In the present example, the guide faces 115.1 are distributed substantially uniformly in the transverse direction of the vehicle on both sides of the longitudinal mid-plane of the vehicle, the guide faces 115.1 of two neighbouring turbulator elements 115 being spaced apart transversely with respect to the local main flow direction by a transverse distance which is substantially Q=50 mm. The effect achieved by this is that the turbulator elements 115 do not overlap one another in the transverse direction of the vehicle, or transversely with respect to the main flow direction 111, so that a part of the air flow can initially flow through between them without deflection. This undeflected part then, however, strikes the part of the air flow deflected by the guide face 115.1, the velocity component of which transversely with respect to the main flow direction 111 then induces the desired local turbulence in the air flow.

Figure 4:
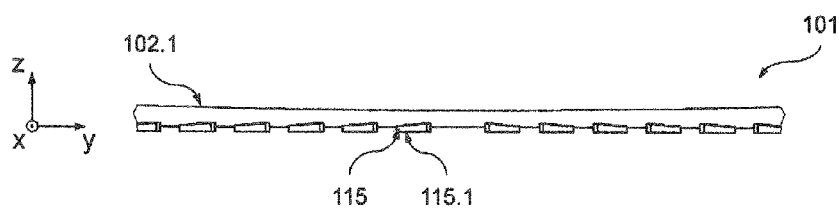
FIG. 4 shows a schematic sectional view of a part of the outer skin of the vehicle in the region of the vehicle nose along the line IV-IV of FIG. 3.
Figure 5:
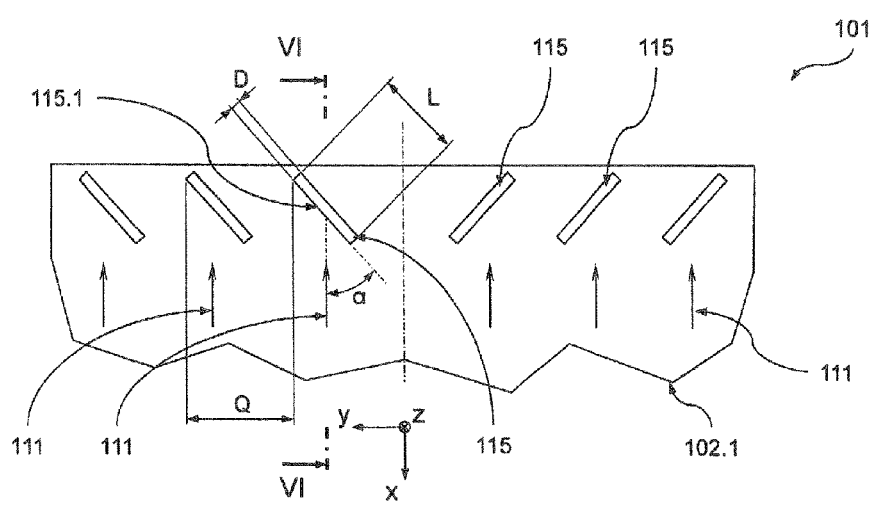
FIG. 5 shows a schematic view of the detail V of FIG. 3 from below.

As can be seen from FIGS. 3 to 5, the guide faces 115.1 respectively on one side of the longitudinal mid-plane of the vehicle are inclined in the same sense with respect to the local normal plane (and therefore also with respect to the local main flow direction 111). Conversely, the guide faces 115.1 on the two sides of the longitudinal mid-plane of the vehicle are inclined in the opposite sense with respect to the local normal plane (and therefore also with respect to the local main flow direction 111). This has, on the one hand, the advantage that a substantially symmetrical flow pattern is created. On the other hand, it has the advantage that the aerodynamic forces caused by the local deflection of the flow, which act on the wagon body 102 transversely with respect to the local main flow direction 111, substantially cancel one another out.

It is, however, to be understood that in other variants of the invention they may also be oriented pairwise and/or groupwise in opposite senses, in order to achieve this effect.

Second Embodiment

Another advantageous embodiment of the vehicle 201 according to the invention, comprising another preferred embodiment of the vehicle component according to the invention in the form of a head module 205, will be described below with reference to FIGS. 1 to 3, 7 and 8. The vehicle 201 corresponds in its basic configuration and functionality to the vehicle 101 of FIGS. 1 to 6, so that only the differences will be discussed here. In particular, components which are of the same type are provided with references increased by the value 100. Unless otherwise mentioned below, with respect to the features, functions and advantages of these components reference is made to the comments above relating to the first embodiment.

Figure 6:
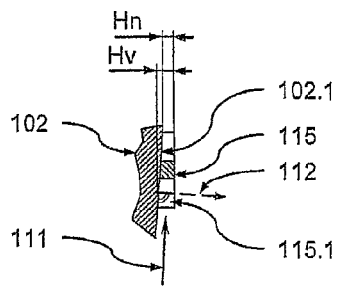
FIG. 6 shows a schematic sectional view of the detail along the line VI-VI of FIG. 5.
Figure 7:
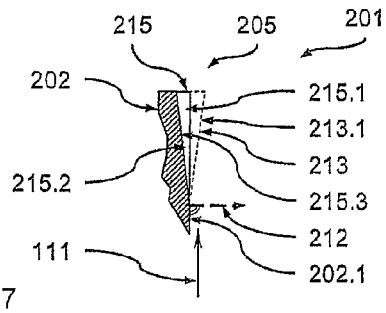
FIG. 7 shows a schematic sectional view of a part of the outer skin of another preferred embodiment of the vehicle according to the invention, comprising another preferred embodiment of the vehicle component, line VII-VII of FIG. 8.
Figure 8:
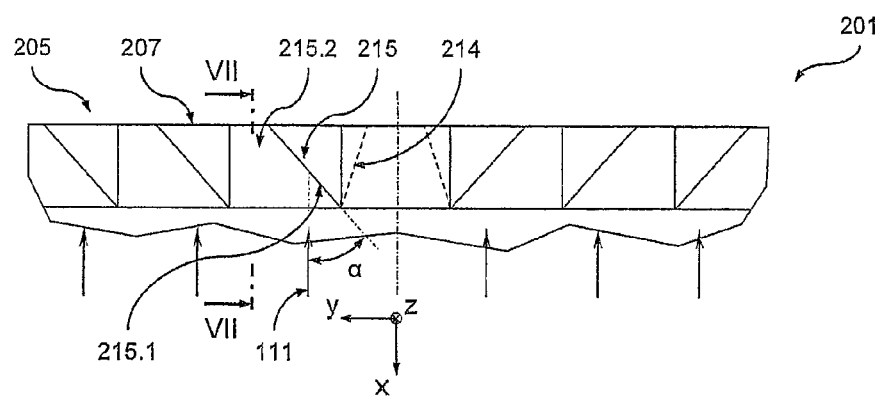
FIG. 8 shows a schematic view of a part of the outer skin of the vehicle of FIG. 7 from below.
Figure 9:
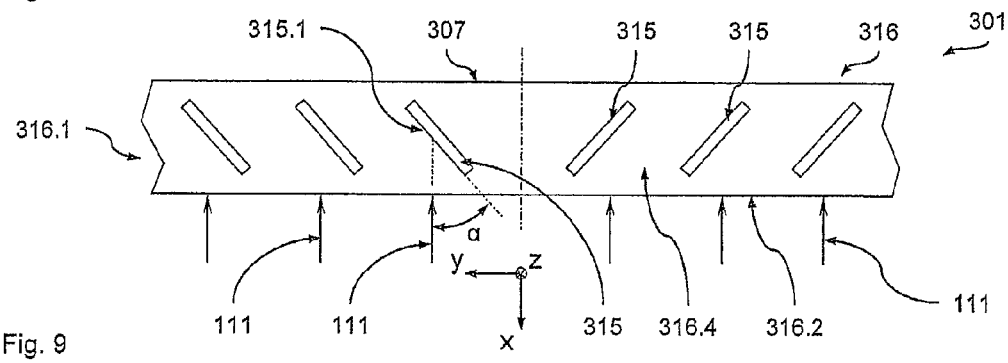
FIG. 9 shows a schematic view of a part of another preferred embodiment of the vehicle according to the invention, comprising another preferred embodiment of the vehicle component according to the invention, from below.
Figure 10:
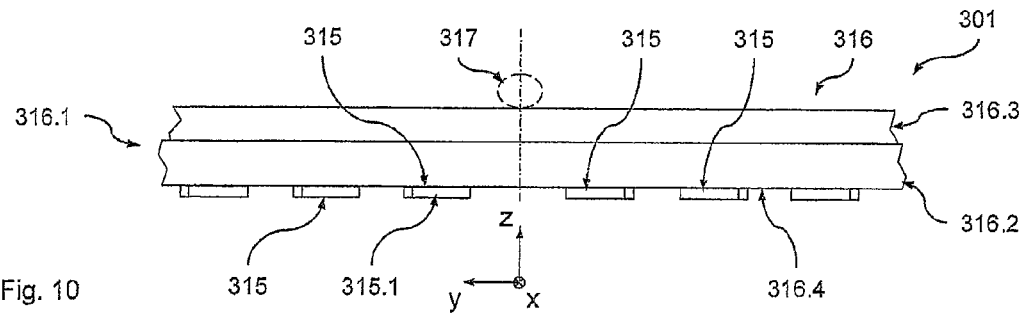
FIG. 10 shows a schematic rear view of a part of the vehicle component of FIG. 9.

FIG. 7 shows a section through the head module 205, which corresponds to the section of FIG. 6, while FIG. 8 shows a view which corresponds to the view of FIG. 5. The only difference from the embodiment of FIGS. 1 to 6 is that the guide face 215.1 is formed by a side wall of a recess 215.2 in the wagon body 202. Here again, moreover, the guide face 215.1 is inclined by the inclination angle α=45° with respect to the local normal plane which is spanned, or defined, by the local surface normal 212 (the surface formed by the outer skin 202.1) and the local main flow direction 111.

The bottom 215.3 of the recess 215.2 extends at a sufficiently shallow angle with respect to the outer skin 201.1 so that the air flow is not yet separating from the surface at the transition into the recess 215.2, and it therefore flows into the recess 215.2 where it is then deflected in the described way by the guide face 215.1 transversely with respect to the main flow direction 111. In this way, transverse deflection of the part of the flow striking the guide face 115.1 is obtained, which as before is achieved substantially in the plane of main extension of the shear layer 108 (the plane of main extension of the shear layer 108 being spanned, or defined, by the local main flow directions 111). As described above, this transverse deflection acting primarily within the plane of main extension is advantageous with respect to small widening of the shear layer 108 in the height direction of the vehicle (z direction) and the low flow resistance.

Furthermore, two guide faces inclined with respect to the local normal plane may be provided in the region of the longitudinal mid-plane of a recess, as indicated by the dashed contours 214 in FIG. 8.

In an alternative configuration, instead of the recess 215.2, projections configured in the manner of a ramp may be provided, as indicated by the dashed contour 213 in FIG. 7. In these variants, the rising surface 213.1 inclined with respect to the main flow direction 111 then forms the guide face, which causes the deflection of the part of the air flow striking it. The ramps 213 may have any desired suitable dimensions in the transverse direction of the vehicle. The ramps 213 may also have a side face inclined with respect to the local normal plane, in a similar way to the guide face 115.1 in the first embodiment. These side faces may, however, also be aligned parallel with the main flow direction. In this configuration as well, any desired suitable distances may be provided between the ramps 213.

Third Embodiment

Another advantageous embodiment of the vehicle component according to the invention, in the form of a pantograph 316 of the vehicle 101, will be described below with reference to FIGS. 1 to 3, 9 and 10. With respect to their basic configuration, arrangement and functionality, the perturbing elements 315 of the pantograph 316 correspond to the perturbing elements 115 of FIGS. 1 to 6, so that only the differences will be discussed here. In particular, components which are the same type are provided with references increased by the value 200. Unless otherwise mentioned below, with respect to the features, functions and advantages of these components reference is made to the comments above relating to the first embodiment.

One difference is that the perturbing elements, or turbulator elements, are arranged on the lower side of a contact device 316.1 of the pantograph 316. More precisely, the turbulator elements 315 are arranged on the lower side of a carrier 316.2 which carries the contact shoe 316.3 of the pantograph 316, this shoe in turn making contact with the overhead wire 317. Another difference is that the turbulator elements 315 are configured as prismatic elements having a constant height dimension, which are placed onto the surface 316.3 of the carrier 316.1 in such a way that they are adjacent to the flow separation edge 307. In other regards, however, the comments made above relating to the turbulator elements 115 apply.

In this way, not only is a particularly advantageous reduction in the sound emission by the pantograph 316 possible, but the vibrations in the pantograph 316 are also reduced by avoiding the pronounced vortex formation in the shear layer.

The present invention has been described above with the aid of examples in which the vehicle component is formed as a head module or pantograph of a vehicle. It is, however, to be understood that the vehicle component according to the invention may also be any other desired component which is exposed to an air flow induced by relative wind.

The present invention has been explained above exclusively for examples of vehicles for multiple-unit trains. It is, however, to be understood that the invention may also be used in connection with other rail vehicles.

The invention claimed is:

1. A vehicle component for a vehicle, in particular a rail vehicle for high-speed traffic, comprising:
    a surface which, during operation, is exposed to a relative wind-induced air flow having a local main flow direction, wherein
    said surface has a flow separation edge at which said air flow separates from said surface, and
    at least one perturbing element located in the region of said flow separation edge is provided, which is formed in order to introduce a perturbation into said air flow,
    wherein
    said perturbing element has at least one guide face protruding into said air flow, wherein
    said guide face being formed, and inclined by an inclination angle with respect to said local main flow direction, in such a way that a velocity component, which is oriented transversely with respect to said local main flow direction and which induces local turbulence in a shear layer of said air flow separating from said surface downstream of said perturbing element at said flow separation edge, is imposed to said part of said air flow striking said guide face.

2. The vehicle component according to claim 1, wherein:
    said surface defines a local surface normal,
    said local surface normal defines a local normal plane with said local main flow direction, and
    said guide face is inclined by said inclination angle with respect to said local normal plane.

3. The vehicle component according to claim 1, wherein said inclination angle is 20° to 70°, preferably 30° to 60°, more preferably 40° to 50°, and in particular substantially 45°.

4. The vehicle component according to claim 1, wherein:
    said guide face has a length dimension which is 5 mm to 80 mm, preferably 15 mm to 65 mm, more preferably 30 mm to 50 mm, in particular substantially 40 mm, or
    said guide face has a height dimension which is 2 mm to 10 mm, preferably 3 mm to 8 mm, more preferably 4 mm to 6 mm, in particular substantially 5 mm.

5. The vehicle component according to claim 1, wherein:
    said guide face is formed on a fin-like projection of said surface, and
    said fin-like projection being formed in particular substantially prismatically.

6. The vehicle component according to claim 5, wherein said fin-like projection has a thickness dimension which is 2 mm to 10 mm, preferably 3 mm to 8 mm, more preferably 4 mm to 6 mm, in particular substantially 5 mm.

7. The vehicle component according to claim 1, wherein said guide face is formed as a side wall of an indentation of said surface.

8. The vehicle component according to claim 1, wherein a plurality of perturbing elements are provided.

9. The vehicle component according to claim 8, wherein said guide faces of two neighbouring perturbing elements are spaced apart transversely with respect to said local main flow direction by a transverse distance which is 20 mm to 100 mm, preferably 30 mm to 80 mm, more preferably 40 mm to 60 mm, in particular substantially 50 mm.

10. The vehicle component according to claim 8, wherein:
said guide faces of two neighbouring perturbing elements are inclined in opposite senses with respect to said local main flow direction, and/or
said guide faces of two neighbouring perturbing elements are inclined in the same sense with respect to said local main flow direction.

11. The vehicle component according to claim 1, wherein:
said surface has a transverse dimension transversely with respect to said local main flow direction, and
said perturbing elements are distributed along said transverse dimension of said surface, in particular uniformly at least in sections.

12. The vehicle component according to claim 1, wherein said surface is formed in order to constitute at least one part of an outer skin of a wagon body of said vehicle.

13. The vehicle component according to claim 1, wherein:
said surface is configured to be arranged on a lower side of wagon body, and
said surface being, in particular, configured to be arranged in the region of an end of a running gear cutout of said wagon body which is a leading end during operation.

14. The vehicle component according to claim 1, wherein:
it is part of a pantograph of said vehicle,
said pantograph having a contact device comprising a contact element for making contact with a overhead line, and
said surface being arranged, in particular, on a lower side of said contact device, facing away from said contact face of said contact element.

15. A vehicle comprising a vehicle component according to claim 1, which, in particular, is a vehicle for high-speed traffic with a nominal operating speed of more than 250 km/h, in particular more than 300 km/h.

* * * * *

UNITED STATES PATENT AND TRADEMARK OFFICE
CERTIFICATE OF CORRECTION

| | | |
|---|---|---|
| PATENT NO. | : 8,985,676 B2 | Page 1 of 1 |
| APPLICATION NO. | : 13/821814 | |
| DATED | : March 24, 2015 | |
| INVENTOR(S) | : Alexander Orellano et al. | |

It is certified that error appears in the above-identified patent and that said Letters Patent is hereby corrected as shown below:

In the Claims

Column 12, Line 6, Claim 13, delete "wagon" and insert -- a wagon --

Signed and Sealed this
Twenty-eighth Day of July, 2015

Michelle K. Lee
*Director of the United States Patent and Trademark Office*